United States Patent
Guo et al.

(10) Patent No.: US 11,474,691 B2
(45) Date of Patent: Oct. 18, 2022

(54) METHOD FOR DISPLAYING A VIRTUAL KEYBOARD ON A MOBILE TERMINAL SCREEN

(71) Applicant: Orange, Issy-les-Moulineaux (FR)

(72) Inventors: Zhihong Guo, Beijing (CN); Cheng Chen, Beijing (CN)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 16/499,127

(22) PCT Filed: Mar. 26, 2018

(86) PCT No.: PCT/IB2018/000579
§ 371 (c)(1),
(2) Date: Sep. 27, 2019

(87) PCT Pub. No.: WO2018/178773
PCT Pub. Date: Oct. 4, 2018

(65) Prior Publication Data
US 2021/0089205 A1   Mar. 25, 2021

(30) Foreign Application Priority Data
Mar. 31, 2017 (WO) ................ PCT/CN2017/078954

(51) Int. Cl.
*G06F 3/04886* (2022.01)
*G06F 9/451* (2018.01)
(Continued)

(52) U.S. Cl.
CPC ......... *G06F 3/04886* (2013.01); *G06F 9/454* (2018.02); *H04M 1/72436* (2021.01); *H04M 1/72454* (2021.01)

(58) Field of Classification Search
CPC ............................ G06F 3/04886; G06F 9/454; H04M 1/72552; H04M 1/72569; H04M 1/72436; H04M 1/72454
See application file for complete search history.

(56) References Cited

U.S. PATENT DOCUMENTS

2009/0327948 A1* 12/2009 Penttinen .......... H04M 1/72436
715/780
2011/0074692 A1* 3/2011 Causey ................. G06F 3/0216
345/169
(Continued)

FOREIGN PATENT DOCUMENTS

EP    2722773 A1    4/2014

OTHER PUBLICATIONS

International Search Report dated Aug. 17, 2018 for corresponding International Application No. PCT/IB2018/000579, filed Mar. 26, 2018.
(Continued)

*Primary Examiner* — Tadesse Hailu
(74) *Attorney, Agent, or Firm* — David D. Brush; Westman, Champlin & Koehler, P.A.

(57) ABSTRACT

A method for displaying a virtual keyboard layout to be used for responding to a received message on a mobile terminal. The method includes: analyzing the received message by a processing unit of the mobile terminal, so as to search for a contextual parameter associated with the received message; selecting, by the processing unit, a virtual keyboard layout, among a set of virtual keyboard layouts displayable on a screen of the mobile terminal, as a function of the result of the search for a contextual parameter associated with the received message; and displaying the selected virtual keyboard layout on the screen.

8 Claims, 4 Drawing Sheets

(51) Int. Cl.
*H04M 1/72436* (2021.01)
*H04M 1/72454* (2021.01)

(56) References Cited

U.S. PATENT DOCUMENTS

| | | | |
|---|---|---|---|
| 2012/0146911 A1* | 6/2012 | Griffin | G06F 3/04886 345/168 |
| 2012/0274569 A1* | 11/2012 | Miroshnichenko | G06F 3/04886 345/168 |
| 2013/0298066 A1* | 11/2013 | Kim | G06F 3/0484 715/773 |
| 2014/0035823 A1 | 2/2014 | Khoe et al. | |
| 2015/0040055 A1* | 2/2015 | Zhao | G06F 40/274 715/773 |
| 2015/0161099 A1* | 6/2015 | Lee | G06F 9/454 345/171 |
| 2015/0350118 A1 | 12/2015 | Yang et al. | |
| 2016/0306438 A1 | 10/2016 | Kehoe et al. | |
| 2016/0359771 A1* | 12/2016 | Sridhar | H04L 51/02 |
| 2017/0003871 A1* | 1/2017 | Broomhall | G06F 3/04886 |
| 2017/0031897 A1 | 2/2017 | Zhang et al. | |
| 2017/0075878 A1* | 3/2017 | Jon | G06F 40/279 |
| 2017/0116184 A1* | 4/2017 | Bradley | G06F 40/263 |
| 2017/0262045 A1* | 9/2017 | Rouvinez | G06F 3/011 |
| 2017/0336926 A1* | 11/2017 | Chaudhri | G06F 3/04842 |
| 2017/0344224 A1* | 11/2017 | Kay | G06F 40/205 |
| 2017/0357443 A1* | 12/2017 | Paek | G06F 3/0482 |
| 2018/0188949 A1* | 7/2018 | Kaye | G06F 3/04886 |

OTHER PUBLICATIONS

Written Opinion of the International Searching Authority dated Aug. 17, 2018 for corresponding International Application No. PCT/IB2018/000579, filed Mar. 26, 2018.

* cited by examiner

METHOD FOR DISPLAYING A VIRTUAL KEYBOARD ON A MOBILE TERMINAL SCREEN

CROSS-REFERENCE TO RELATED APPLICATIONS

This Application is a Section 371 National Stage Application of International Application No. PCT/IB2018/000579, filed Mar. 26, 2018, which is incorporated by reference in its entirety and published as WO 2018/178773 A1 on Oct. 4, 2018, in English.

FIELD OF THE INVENTION

The field of this invention is that of mobile terminals. More particularly, the invention relates to a method for displaying a virtual keyboard on a mobile terminal screen, when responding to messages received on such a mobile terminal.

BACKGROUND OF THE INVENTION

Recent mobile phones (smartphones) are generally no more provided with a physical keyboard. Instead, they present a large touchscreen (covering most of the front surface), and use as an on-screen input method a software component called a "virtual keyboard".

More precisely, when in use, the virtual keyboard displays at least one keyboard layout on the screen (see the example of FIG. 1) so as to define a "soft keyboard", i.e. a set of sensing areas corresponding to keys. Text is commonly inputted by tapping these sensing areas (so-called "soft keys").

The virtual keyboard is generally activated when required, for instance continuously when running messenger applications such as SMS, e-mails client, Whatsapp, etc., or when a textual input is requested in various applications. The virtual keyboard may comprise a dedicated soft key for hiding/revealing it.

Usually, a "default" layout of the virtual keyboard is displayed in order to type messages in this application. This default layout is generally the standard keyboard layout for the set language, for instance a QWERTY-based layout (see the example of FIG. 1) if the set language is English.

This default virtual keyboard layout can be manually switched to other predefined keyboard layout by the user himself, for instance when the user wants to switch between different languages depending on the language spoken by the counterpart of a conversation. For example, when typing in French, an AZERTY-based virtual keyboard layout can be preferred. This can be done by pressing a dedicated soft key, in order to change the language (of at least being proposed a list of international keyboards layouts, i.e. layouts corresponding to other languages). Another example is when the user wants to input numerical values which are not available in the default keyboard layout. Pressing on another dedicated soft key of the default keyboard layout allows switching to a numerical virtual keyboard layout. Once the switch is done, the new settings will be used for all of the input unless the user changes it again.

Therefore, the user may very often have to manually switch the virtual keyboard layout, which can be tedious.

Consequently, it has been proposed the idea of an automatic virtual keyboard language switching whereby different virtual keyboard layouts corresponding to different languages are automatically displayed depending on the language used in a previous conversation with the same recipient. The mobile terminal stores, for each conversation with a specific recipient, the last virtual keyboard layout selected by this user so that whenever the user wants to continue the conversation, he is provided with the virtual keyboard layout corresponding to the language used previously in this conversation. See for example: http://www.idownloadblog.com/2012/09/24/international-keyboard-automatically-switch.

However, such a known solution is not fully automatic as it still relies on the choice of a virtual keyboard layout made by the user at a certain time for a given interlocutor, and is thus prone to errors. This solution requires also to store, for each interlocutors, an ID of the last virtual keyboard layout used with this interlocutor, which can be unnecessarily burdensome and memory costly over time for users dealing with large number of different interlocutors, even when some of them are just "one-time" interlocutors. This solution is also very static and limited as it only allows changing from language between different interlocutors. Besides, this prior art solution does not work when receiving a first message from an interlocutor, the default virtual keyboard layout being used in such a situation although its language might not be appropriate to the sender of this first message.

There is therefore a need to address these issues and propose a fully automatic (i.e. not based on the user's selection) and dynamic (i.e. can be adapted for every individual message received from the same sender) switching method which provides a user with the most appropriate layout of virtual keyboard, among several possible virtual keyboard layouts (including international keyboard layouts but also "non-textual" keyboard layouts), for carrying out efficiently a messenger conversation, with the best user experience.

SUMMARY OF THE INVENTION

For these purposes, the present invention provides a method for displaying a virtual keyboard layout to be used for responding to a received message on a mobile terminal, the method comprising:
  analyzing said received message by a processing unit of the mobile terminal, so as to search for a contextual parameter associated with the received message;
  selecting, by the processing unit, a virtual keyboard layout, among a set of virtual keyboard layouts displayable on a screen of the mobile terminal, as a function of the result of the search for a contextual parameter associated with the received message; and
  displaying the selected virtual keyboard layout on the screen.

As it will be shown, this determination of a virtual keyboard layout is only based on the message to which the user wishes to respond. This method is thus fully automated, as there is no need to have already sent a message in this conversation, very efficient, and adaptive as different layout could be selected in the same conversation according to its context.

Preferred but non limiting features of the present invention are as follow:
  at the analyzing step, a contextual parameter is determined associated with the received message if a syntactical item or a pattern of syntactical items representative of said contextual parameter is identified within the received message;

for each of a plurality of possible contextual parameters, a list of syntactical items or patterns of syntactical items representative of the contextual parameter is stored on a memory of the terminal;

each contextual parameter is a parameter among a language, a type of query, an emoji theme
the method comprises:
if the contextual parameter is a language, said syntactical items or patterns of syntactical items representative of the contextual parameter are words of a dictionary,
if the contextual parameter is a type of query, said syntactical items or patterns of syntactical items representative of the contextual parameter are combinations of predetermined interrogative words and/or the "?" character.
If the contextual parameter is a type of emoji use, said syntactical items or patterns of syntactical items representative of the contextual parameter are predetermined emojis.
at least one contextual parameter is associated to each virtual keyboard layout, the virtual keyboard layout selected at step being the virtual keyboard layout associated with a contextual parameter found at analyzing step;
a priority order is defined between the virtual keyboard layouts, the selection step being performed according to said priority order when at least two virtual keyboard layouts are associated with a contextual parameter associated with the message found at analyzing step;
said set of virtual keyboard layouts comprises at least one international layout associated with a language, at least one non-alphabetical layout associated with a type of query, and at least one emoji layout associated to an emoji theme;
a default virtual keyboard layout is selected at step if no contextual parameter associated with the received message is found to be associated with the received message during analyzing step.

In a second aspect, the invention provides a mobile terminal comprising a processing unit and a screen, the processing unit being configured to:
analyze a received message so as to search for a contextual parameter associated with the received message;
select a virtual keyboard layout among a set of virtual keyboard layouts displayable on the screen as a function of the result of the search for a contextual parameter associated with the received message, for display by the screen.

According to a third and a fourth aspects, the invention provides a computer program product, comprising code instructions for executing a method according to the first aspect for displaying a virtual keyboard layout to be used for responding to a received message on a mobile terminal; and a computer-readable medium, on which is stored a computer program product comprising code instructions for executing a method according to the first aspect for displaying a virtual keyboard layout to be used for responding to a received message on a mobile terminal.

BRIEF DESCRIPTION OF THE DRAWINGS

The above and other objects, features and advantages of this invention will be apparent in the following detailed description of an illustrative embodiment thereof, which is to be read in connection with the accompanying drawings wherein.

DETAILED DESCRIPTION OF A PREFERRED EMBODIMENT

Architecture

Figure 1:
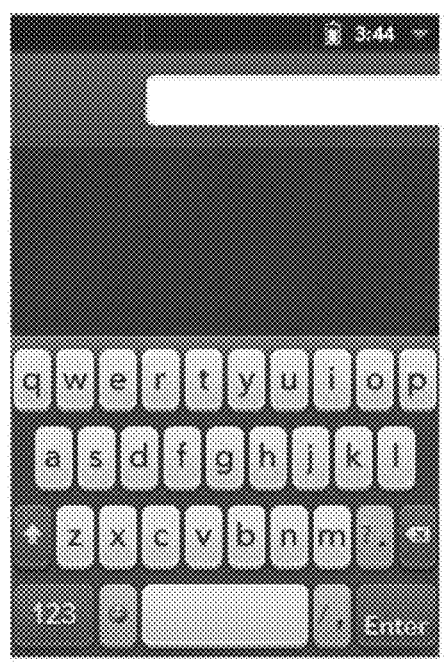
FIG. 1, already discussed, represents an example of a virtual keyboard for a mobile terminal.
Figure 2:
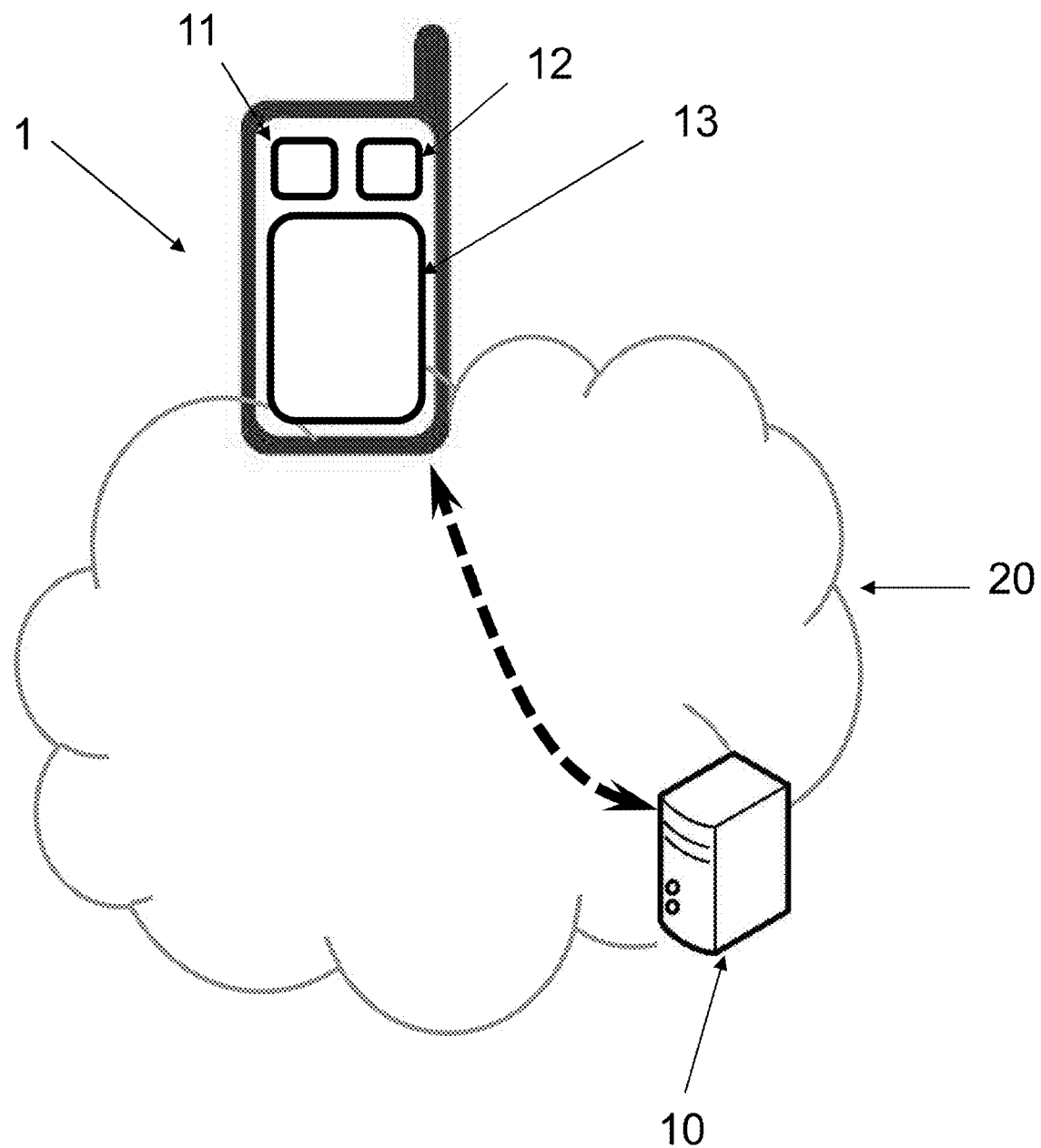
FIG. 2 illustrates an example of architecture in which the method according to the invention is performed.

The present invention relates to a method for operating a mobile terminal 1 as represented by FIG. 2. More precisely, the present method is for displaying a virtual keyboard layout, to be used for typing a response message to a received message on the mobile terminal 1.

The mobile terminal 1 is a device comprising a processing unit 11, i.e. a CPU (one or more processors), a memory 12 (for example flash memory), and a screen 13 (preferably touch sensitive) for user interface. The memory 12 is in particular for storing applications, which can be of various types, and data. The terminal 1 also typically comprises a battery, in particular a rechargeable battery (for instance lithium polymer), for powering the processing unit 11 and other units.

The terminal 1 may further comprise other units such as a location unit for providing location data representative of the position of the terminal 1 (using for example GPS, network triangulation, etc.), a communication unit for connecting (in particular wirelessly) the terminal 1 to a network 20 (for example WiFi, Bluetooth, and preferably a mobile network, in particular a GSM/UMTS/LTE network, see below), etc.

Indeed, the terminal 1 is typically a smartphone, a tablet computer, a laptop, etc. In the following description the example of a smartphone will be used.

Virtual keyboard layouts

The present method is performed by the processing unit 11 of the terminal 1, and is implemented either by a messaging application of the terminal (a SMS client, an e-mail client, chat application, Whatsapp, etc.) or a dedicated software application.

Said messaging application receives a message from the network and allows typing a response message using a virtual keyboard, i.e. a "soft keyboard", on the screen 13.

More precisely, as explained the virtual keyboard is provided with a plurality (i.e. n) of virtual keyboard layouts $VKL_i$ displayable on the screen 13, forming a set $\{VKL_i\}_{i \in [0;n]}$.

Preferably, the set of virtual keyboard layouts $\{VKL_i\}_{i \in [0;n]}$ may comprise some or all of:
a "default" layout $VKL_0$ (typically the layout of the keyboard associated with the set language of the terminal 1, for instance a QWERTY-based layout if the language is English),
one or more "international" layouts (layouts of the keyboard associated with other languages than the set language of the terminal 1, for example AZERTY-based, QWERTZ-based, Cyrillic, etc., layouts),
one or more "non-alphabetical" layouts, including a "numerical" layout (as explained, keys of these layout are digits, punctuations, or mathematical symbols), possibly also including special layouts such as a layout representing a clock, a layout representing a calendar, etc., one of more "emoji" layouts (keys of these layouts are ideograms and smileys, generally sorted by theme, as defined in the Unicode character space)

As it will be explained, for the present method, these virtual keyboard layouts $VKL_i$ are specifically associated with respective "contextual parameters", i.e.

attributes of the messages that would require the use of such layouts. Preferably, every layout except the default one is associated with at least one contextual parameter.

The contextual parameters may be chosen among a language (English, French, Chinese, etc.), a type of query (query about a quantity, query about a time, query about a date, etc.), a theme of emojis (smileys, love symbols, etc.), etc. Examples thereof will be detailed later.

Figure 3:
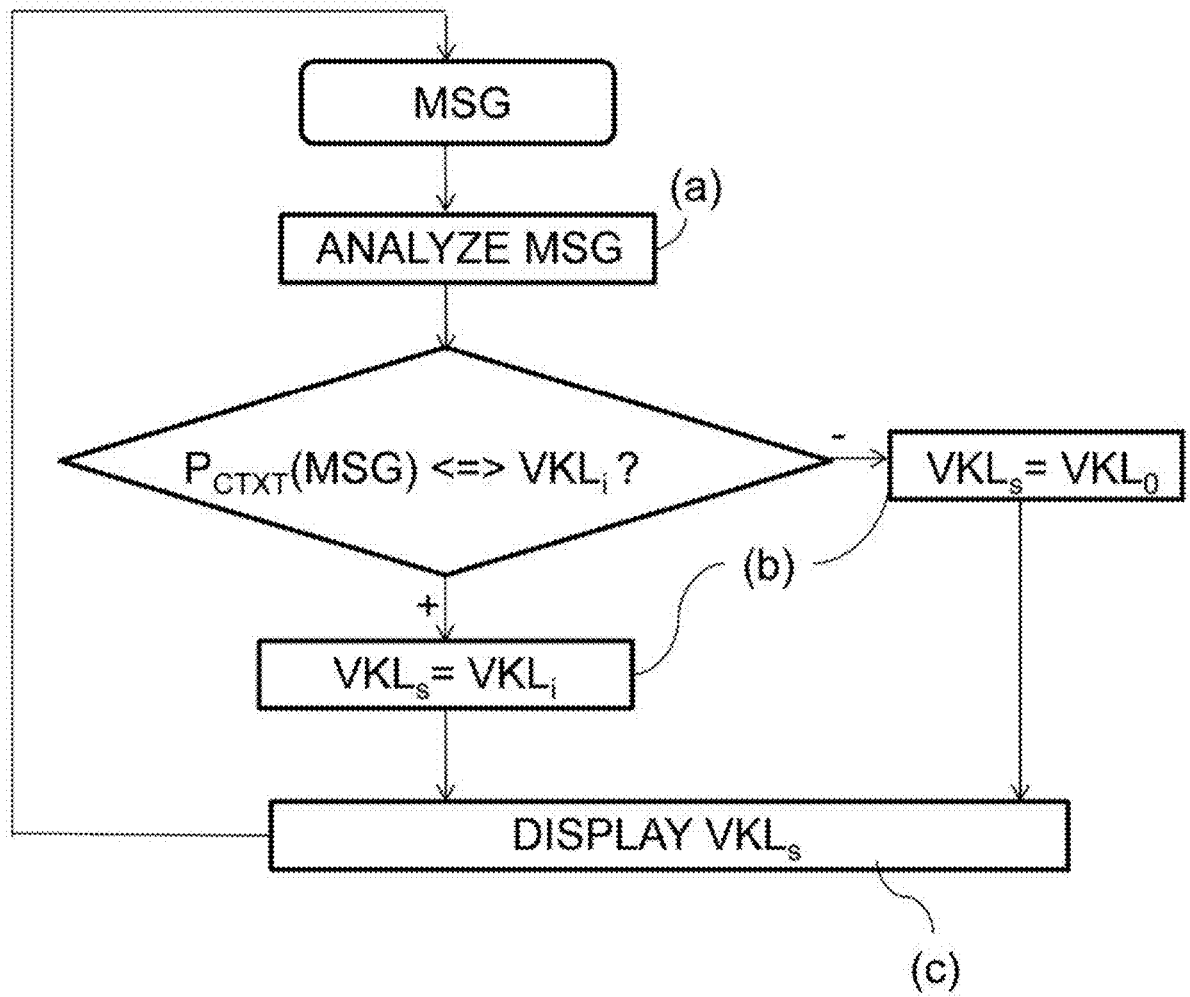
FIG. 3 illustrates an embodiment of a method for displaying a virtual keyboard layout according to the present invention.

We refer now to FIG. 3 which illustrate an embodiment of a method for displaying a virtual keyboard layout according to the present invention.

The present method can typically start when, after having received a message MSG in a messaging application, the users decide to type a response using this application. For example, a notification of reception of the message MSG is displayed on the screen, and the user taps this notification so as to open the message in the messaging application.

Normally, it would simply launch the virtual keyboard (with the default layout $VKL_0$, or eventually the last layout selected for the conversation to which the received message belongs).

To the contrary, the present method comprises a first step (a) wherein the processing unit 11 analyzes the received message MSG so as to search for contextual parameter(s) $P_{CTXT}(MSG)$ associated with this message MSG. This analysis can be performed directly within the messaging application, or by calling an API or another dedicated application.

Contextual parameters $P_{CTXT}(MSG)$ are "searched for", meaning that the processing unit 11 attempts at determining them, but they are not necessarily found, for instance if the message is very short and not meaningful. More precisely, zero, one, or more contextual parameter(s) associated with the text could be identified (examples will be detailed later).

Syntactical Analysis

The analysis performed on the received message MSG is typically a syntactical analysis. By syntactical analysis, it is meant a recognition of given words and others symbols (such as punctuation or emojis), i.e. "syntactical items" of the message (by syntactical item, it will be understood any basic "block" of characters (letters and/or symbols) of the message, having a meaning). Syntactical analysis is well known by the skilled person and can be perform simply by parsing the text of the message into a sequence of syntactical items. Thus, a contextual parameter $P_{CTXT}(MSG)$ associated with the message MSG is advantageously determined at this step (a) if a syntactical item or a pattern of syntactical items representative of said contextual parameter is identified within the message. To this end, for each of a plurality of possible contextual parameters, a list of syntactical items or patterns of syntactical items representative of the contextual parameter is preferably stored on the memory 12 of the terminal 1. For instance:

if the contextual parameter is a language, said syntactical items or patterns of syntactical items representative of the contextual parameter are words of a dictionary (or simply a list of words/expressions typically present in short message, like welcoming and parting phrases). For example, the word "Hello" is a syntactical item representative of the language "English", while the word "bonjour" is a syntactical item representative of the language "French".

the contextual parameter is a type of query, said syntactical items or patterns of syntactical items representative of the contextual parameter are combinations of predetermined interrogative words and/or the "?" character. More precisely, the syntactic unit question mark is sufficient for identifying a query, but not sufficient for determining which type of query. For example, the patterns ("How much"/"how many")+"?" are patterns of syntactical items representative of a "query about a quantity", the word "WT" or the pattern "What time"+"?" is a pattern of syntactical items representative of a "query about a time", the pattern "When"+"?" is a pattern of syntactical items representative of a query about a date, etc.

If the contextual parameter is an emoji theme, said syntactical items or patterns of syntactical items representative of the contextual parameter are predetermined emojis, in particular emojis of the same theme. For example, a smiling face "☺" is a syntactical item representative of the emoji theme "smileys", while a heart shaped emoji is a syntactical item representative of the emoji theme "love emojis".

In other words, predetermined syntactical items or patterns thereof (those of the lists), each being associated to a contextual parameter, are searched for in the received message MSG. If they are found, the corresponding contextual parameter(s) $P_{CTXT}(MSG)$ are determined as being associated to the message MSG. It is to be understood that a plurality of contextual parameters $P_{CTXT}(MSG)$ can be simultaneously determined. For example if the received message MSG is "Bonjour;)", then both contextual parameters "French" and "Smileys" can be found.

Said lists of syntactical items or patterns of syntactical items can be stored locally in the memory 12 of the terminal 1, but also downloaded from a network server 10. Such dictionary could be generated by Nature Language Processing (NLP) or any other machine learning algorithm.

Virtual Keyboard Layout Selection

In a further step (b), the processing unit 11 selects a virtual keyboard layout $VKL_s$ among the set of virtual keyboard layouts $\{VKL_i\}_{i \in [0;n]}$ (i.e. $s \in [0;n]$) as a function of the result of the search for contextual parameters(s) $P_{CTXT}(MSG)$ associated with the received message MSG.

As explained, these virtual keyboard layouts $VKL_i$ are each specifically associated with one or more contextual parameters. For instance:

the "default" and/or "international" layouts are set with different languages (QWERTY with English, AZERTY with French, QWERTZ with German, etc.), the "numeric" and/or "non-alphabetical" layouts are associated with query types (a numerical layout if the query is about a quantity, a clock layout it the query is about a time, a calendar layout is the query is about a date, etc.), the "emoji" layout are associated with emoji themes (in particular the layout of an emoji theme is associated with its emoji theme). If no contextual parameter $P_{CTXT}(MSG)$ associated with the received message MSG has been found, or if a contextual parameter $P_{CTXT}(MSG)$ has been found to which no virtual keyboard layout $VKL_i$ is associated, then the default virtual keyboard layout $VKL_0$ can be selected (for instance an English language standard QWERTY-based layout as explained), i.e. $VKL_s = VKL_0$.

If only one contextual parameter $P_{CTXT}(MSG)$ is determined during the analysis, then the selected layout $VKL_s$ is the virtual keyboard layout $VKL_i$ to which this parameter $P_{CTXT}(MSG)$ is associated. It is to be understood that the selected virtual keyboard layout $VKL_s$ can still be the default virtual keyboard layout $VKL_0$, if the found contextual parameter $P_{CTXT}(MSG)$ is associated with this layout (for instance the QWERTY-based layout is associated with the contextual parameter English).

If more than one contextual parameter $P_{CTXT}(MSG)$ is determined, they are several possibilities.

Firstly, they could be a layout associated to this combination of contextual parameters. For example, there could be several clock layouts, each corresponding to a different language (the English clock layout will have "a.m." or "p.m." abbreviations), therefore, the combination of contextual parameters "English" and "query about a time" will led to the selection of this English clock layout.

Alternatively, a choice between several "candidate" layouts $VKL_i$ could be done. In particular, a priority of some layouts over others could be decided. In particular, it is advantageously provided a priority of the international layouts over the default layout, a priority of the emoji layouts over the international layouts, and a priority of the non-alphabetical layouts over the emoji layouts.

For example, if there is only a generic clock layout (i.e. only associated with the contextual parameter "query about a time") the above mentioned combination of contextual parameters "English" and "query about a time" will led to the selection of the clock layout over the QWERTY-based layout. Similarly the message "Bonjour;)" will led to the selection of the smiley-themed emoji layout over the AZERTY-based layout.

In some particular cases, if for example the message is drafted using two different languages at the same time, a random selection between several layouts could be performed.

In a final step (c), the selected virtual keyboard layout $VKL_s$ is displayed on the screen 13, so as to be used by the user for typing the response message. This method can then be applied again when receiving another message, within the same conversation with the interlocutor or in another conversation with another interlocutor.

This way, a very flexible virtual keyboard adaptation can be achieved, by using a message-by-message analysis in order to find, for each received message, the best virtual keyboard layout to use.

Figure 4:
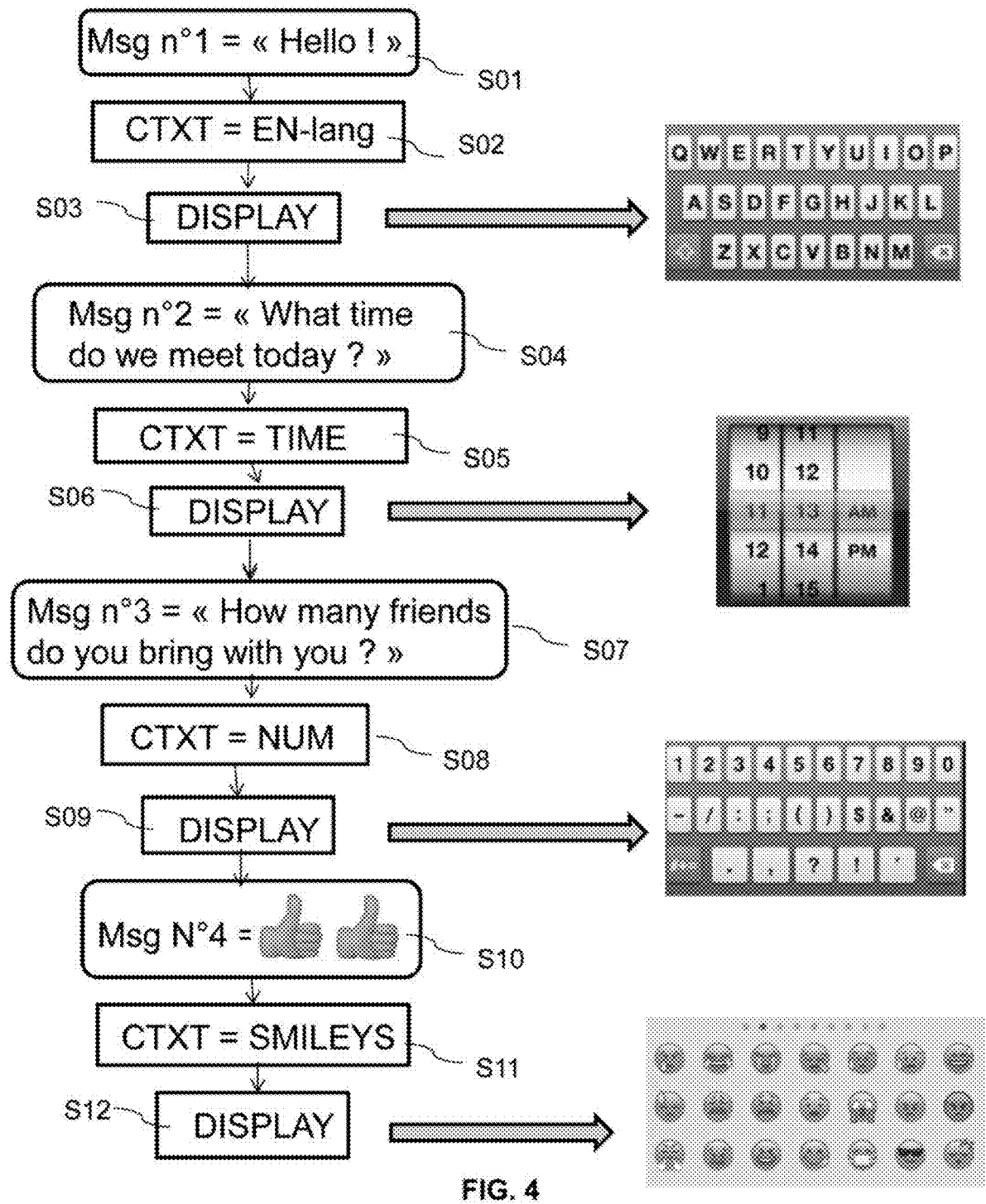
FIG. 4 illustrates an exemplary conversation using the method in accordance with an embodiment of the present invention.

FIG. 4 illustrates an exemplary conversation using the method in accordance with an embodiment of the present invention.

In this exemplary conversation:

1) the sender sends a first message "Hello !" which is received by mobile terminal 1 (step S01), 2) on the mobile terminal 1, in spite of having a French default virtual keyboard layout, the English language is recognized from the use of "Hello" (step S02) and the messaging application is thus instructed to display an English layout virtual keyboard (step S03), which the user can then use to reply "Hello", 3) the sender sends then (step SO4) a second message including the question "What time do we meet today ?" which is received by mobile terminal 1, 4) on the mobile terminal 1, a query about a time event is recognized (thanks to the pattern "What time"+"?") (step S05) and the messaging application is thus instructed to display the clock layout of virtual keyboard (or simply the numerical layout), which the user can then easily use to indicate "16:00" or "4 pm" (step 06), 5) the sender sends then (step 07) a third message including the question "How many friends do you bring with you ?" which is received by mobile terminal 1, 6) on the mobile terminal 1, a query about a quantity is recognized, thanks to the pattern "How many"+"?" (step S08), and the messaging application is thus instructed to display the numerical layout of the virtual keyboard, which the user can then easily use to indicate "2" (step S09), 7) the sender sends then (step S10) a fourth message including an Emoji "thumbs up" which is received by mobile terminal 1, 8) on the mobile terminal 1, the use of an Emoji is detected (step S11) and thus the virtual keyboard is switched to Emoji input, that is to say the messaging application is instructed to display the emoji layout of the virtual keyboard (step S12).

Terminal and Computer Program

The present invention concerns mobile terminal 1 comprising a processing unit 11 and a screen 13 (preferably a touchscreen). This terminal 1 may also comprise a memory 12.

The aforementioned processing unit 11 is in particular configured to implement, preferably when being requested (via a messaging application) the typing of a response message to a received message using a virtual keyboard provided with a set of layouts of the virtual keyboard displayable on the screen, the steps of:

analyze a received message MSG so as to search for a contextual parameter $P_{CTXT}(MSG)$ associated with the received message MSG;

select a virtual keyboard layout $VKL_s$ among a set of virtual keyboard layouts $\{VKL_i\} i \in [0;n]$ displayable on the screen as a function of the result of the search for a contextual parameter $P_{CTXT}(MSG)$ associated with the received message MSG;

The screen 13 is configured to display the selected virtual keyboard layout $VKL_s$.

The invention further proposes a computer program product, comprising code instructions for executing (in particular with a processing unit 11 of the terminal 1) the previously described method, as well as a computer-readable medium (in particular a memory 12 of the terminal 1), on which is stored a computer program product comprising code instructions for executing said method. In particular, this computer program product may correspond to the possibly dedicated software application discussed previously, and/or a messaging application.

The invention claimed is:

1. A method for displaying a virtual keyboard layout to be used for responding to a received message on a mobile terminal, the method comprising the following acts performed by the mobile terminal:

analyzing said received message by a processing unit of the mobile terminal, so as to search for a contextual parameter associated with the received message and to determine the contextual parameter to be associated with the received message if a syntactical item or a pattern of syntactical items representative of said contextual parameter is identified within the received message, wherein the contextual parameter is a parameter among a type of query and an emoji theme and wherein:

if the contextual parameter is the type of query, said syntactical items or patterns of syntactical items representative of the contextual parameter are combinations of predetermined interrogative words and/or the "?" character; and if the contextual parameter is the emoji theme, said syntactical items or patterns of syntactical items representative of the contextual parameter are predetermined emojis;

selecting, by the processing unit, the virtual keyboard layout, among a set of virtual keyboard layouts displayable on a screen of the mobile terminal, as a function of the result of the search for the contextual parameter associated with the received message; and displaying the selected virtual keyboard layout on the screen.

2. The method according to claim 1, wherein, for each of a plurality of possible contextual parameters, a list of syntactical items or patterns of syntactical items representative of the contextual parameter are stored on a memory of the terminal.

3. The method according to claim 1, wherein at least one contextual parameter is associated to each virtual keyboard layout, the virtual keyboard layout selected at the act of selecting being the virtual keyboard layout associated with the contextual parameter found at the analyzing act.

4. The method according to claim 3, wherein a priority order is defined between the virtual keyboard layouts, the selecting act being performed according to said priority order when at least two virtual keyboard layouts are associated with the contextual parameter found at the analyzing act.

5. The method according to claim 4, wherein said set of virtual keyboard layouts comprises at least one non-alphabetical layout associated with the type of query and at least one emoji layout associated to the emoji theme.

6. The method according to claim 1, wherein a default virtual keyboard layout is selected if no contextual parameter is found to be associated with the received message during the analyzing act.

7. A mobile terminal comprising:
a processing unit; and
a screen, the processing unit being configured to:
analyze a received message so as to search for a contextual parameter associated with the received message and determine the contextual parameter to be associated with the received message if a syntactical item or a pattern of syntactical items representative of said contextual parameter is identified within the received message, wherein the contextual parameter is a parameter among a type of query and an emoji theme and wherein:

if the contextual parameter is the type of query, said syntactical items or patterns of syntactical items representative of the contextual parameter are combinations of predetermined interrogative words and/or the "?" character; and if the contextual parameter is the emoji theme, said syntactical items or patterns of syntactical items representative of the contextual parameter are predetermined emojis;

select a virtual keyboard layout among a set of virtual keyboard layouts displayable on the screen as a function of the result of the search for the contextual parameter associated with the received message, for display by the screen.

8. A non-transitory computer-readable medium, on which is stored a computer program product comprising code instructions for executing a method for displaying a virtual keyboard layout to be used for responding to a received message on a mobile terminal, when the code instructions are executed by a processing unit of the mobile terminal, wherein the code instructions configure the mobile terminal to:

analyze said received message so as to search for a contextual parameter associated with the received message and determine the contextual parameter to be associated with the received message if a syntactical item or a pattern of syntactical items representative of said contextual parameter is identified within the received message, wherein the contextual parameter is a parameter among a type of query and an emoji theme, and wherein:

if the contextual parameter is the type of query, said syntactical items or patterns of syntactical items representative of the contextual parameter are combinations of predetermined interrogative words and/or the "?" character; and if the contextual parameter is the emoji theme, said syntactical items or patterns of syntactical items representative of the contextual parameter are predetermined emojis;

select the virtual keyboard layout, among a set of virtual keyboard layouts displayable on the screen of the mobile terminal, as a function of the result of the search for the contextual parameter associated with the received message; and displaying the selected virtual keyboard layout on the screen.

* * * * *